(12) United States Patent
Suzuki (10) Patent No.: US 6,674,573 B2
(45) Date of Patent: Jan. 6, 2004

(54) LASER MICROSCOPE

(75) Inventor: Motohiko Suzuki, Kawasaki (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/213,168

(22) Filed: Aug. 6, 2002

(65) Prior Publication Data

US 2003/0030897 A1 Feb. 13, 2003

(30) Foreign Application Priority Data

Aug. 9, 2001 (JP) ......................................... 2001-242634

(51) Int. Cl.[7] ............................................... G02B 21/00
(52) U.S. Cl. ...................... 359/368; 359/385; 250/458.1
(58) Field of Search ................................ 359/350, 363, 359/368, 385, 386, 389; 250/458.1, 461.1

(56) References Cited

U.S. PATENT DOCUMENTS

| | | | |
|---|---|---|---|
| 5,760,951 A | * 6/1998 | Dixon et al. ................. | 359/385 |
| 6,094,300 A | * 7/2000 | Kashima et al. ............. | 359/385 |
| 6,167,173 A | * 12/2000 | Schoeppe et al. ............. | 385/33 |
| 6,437,913 B1 | 8/2002 | Kishi | |
| 2001/0012151 A1 | * 8/2001 | Knebel ....................... | 359/368 |

\* cited by examiner

Primary Examiner—Mark A. Robinson
(74) Attorney, Agent, or Firm—Frishauf, Holtz, Goodman & Chick, P.C.

(57) ABSTRACT

A laser microscope includes a beam scanning mechanism to scan a laser beam. An objective lens condenses the beam, and receives from a specimen the light by a linear and a non-linear phenomenon evoked by condensation of the beam, and a reflect light. A first beam splitter is arranged between the objective lens and the scanning mechanism, and separates the laser beam, the light by the linear phenomenon and the reflected light, from the light by the non-linear phenomenon. A first photodetector detects the light by the non-linear phenomenon. A second beam splitter is arranged between a light source and the scanning mechanism to separate the beam from the light by the linear phenomenon. A second photodetector detects the light passing a pinhole arranged at a position conjugative to the focal point of the objective lens among the light by the linear phenomenon and the reflected light.

19 Claims, 8 Drawing Sheets

LASER MICROSCOPE

CROSS-REFERENCE TO RELATED APPLICATIONS

This application is based upon and claims the benefit of priority from the prior Japanese Patent Application No. 2001-242634, filed Aug. 9, 2001, the entire contents of which are incorporated herein by reference.

BACKGROUND OF THE INVENTION

1. Field of the Invention

The present invention relates to a laser microscope which condenses a laser beam onto a specimen and detects the light obtained from the specimen.

2. Description of the Related Art

For fluorescent observation of a specimen such as a living tissue by laser microscope, a specimen is at present colored with a plurality of fluorescent reagents. In other words, a plurality of fluorescent reagents is used to color one specimen. A plurality of different wavelength laser beams is irradiated onto the specimen in multiple fluorescence observation. The form and function of a living body cell can be analyzed using this method.

For instance, when an excited light (a laser beam) with a single wavelength (hereinafter referred to as 1-wavelength) is irradiated onto a specimen. There is a reagent which generates 1-wavelength excited 2-wavelength fluorescence, which fluorescence in two wavelength on the specimen (hereinafter referred to as 2-wavelengths). There is another reagent which evokes energy transfer (Fluorescence Resonance Energy Transfer) which excites another fluorescence coloring material by the energy of one excited fluorescence coloring material. It is practical to obtain the fluorescence quantity ratio of such fluorescence by observing a 2-wavelength fluorescence with respect to a 1-wavelength excited beam.

As a reagent which generates 1-wavelength excited 2-wavelength fluorescence, SNARF-1 for example is known. SNARF-1 is used for measurement of pH. Recently, a probe called Cameleon (trademark) has been used for measurement of calcium ion density. This utilizes the energy transfer of two fluorescence proteins CFP and YFP. That is, CFP is excited by a laser beam with a predetermined wavelength, and YFP is excited by the energy of this excited CFP. And, the fluorescence quantity ratio of CFP wavelength and YFP wavelength is measured.

Further, a laser microscope utilizing multi-photon excitation evoked by a laser beam emitted from an ultra-short pulse laser source has been used. An ultra-short pulse laser causes multi-photon excitation, excites a fluorescence reagent for generating ultraviolet-rays in near infrared wavelength, and resultantly generates fluorescence. This type of microscope is capable of observing a specimen deeply with little influence to the specimen.

However, it is disadvantageous to detect fluorescence by using the optical system similar to that of an ordinary confocal microscope. Use of a number of lenses and mirrors increases transmission loss and decreases the intensity of the detectable fluorescence.

U.S. patent application Ser. No. 09/525,165 (now U.S. Pat. No. 6,437,913 issued Aug. 20, 2002) discloses a laser microscope technology, which separates fluorescence without returning it to the scanning optical system and confocal pinhole. This technology proposed a microscope to effectively detect fluorescence by making the optical path short with minimized loss.

A microscope using this technology is provided with a laser light source and photodetector for confocal detection, and an ultra-short pulse laser light source and photodetector to emit a laser beam to evoke multi-photon excitation. A beam splitter for confocal detection and a beam splitter for detection of the fluorescence generated by multi-photon excitation are also provided between the objective lens and the scanning optical system. These beam splitters are switched for confocal detection of fluorescence and detection of fluorescence generated by multi-photon excitation.

Further, a laser beam to be emitted and beam splitters must be switched for detection of fluorescence, in the above U.S. patent application Ser. No. 09/525,165 (now U.S. Pat. No. 6,437,913). This makes it difficult to simultaneously observe and measure a plurality of forms and functions of a living body tissue.

BRIEF SUMMARY OF THE INVENTION

The present invention is to provide a laser microscope which can simultaneously detect a plurality of lights obtained from a specimen when a laser beam is irradiated onto the specimen.

According to an aspect of the invention, there is provided a laser microscope for observing a specimen, comprising:

a laser light source to radiate a laser beam;

a scanning optical system to scan the laser beam radiated from the laser light source in at least one direction;

an objective lens to condense the laser beam scanned by the scanning optical system onto a specimen, and to receive from the specimen the light generated by a linear phenomenon and the light generated by a non-linear phenomenon evoked by condensation and the reflected light of the laser beam;

a first beam splitter which is arranged between the objective lens and the scanning optical system, and selectively separates the laser beam, the light obtained from the specimen by the linear phenomenon and the reflected light, from the light obtained from the specimen by the non-linear phenomenon;

a first photodetector to detect the light generated by the non-linear phenomenon and separated by the first beam splitter;

a second beam splitter which is arranged between the laser light source and the scanning optical system, and separates the laser beam from the light obtained from the specimen by the linear phenomenon and the reflected light; and, a second photodetector which has a pinhole arranged at a position conjugative to the focal point of the objective lens, and detects the light passing the pinhole among the light generated by the linear phenomenon and the reflected light separated by the second beam splitter.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Preferred embodiments of the present invention will be explained hereinafter with reference to the accompanying drawings.

These embodiments utilize a non-linear phenomenon, for example, 2-photon excitation. Compared to a linear phenomenon described later, 2-photon excitation excites a specimen by long-wavelength light of relatively high power. As a result, the specimen emits fluorescence of a shorter wavelength than that of the long-wavelength light as excited light. Contrarily, in a linear phenomenon, for example, 1-photon excitation, a specimen is excited by short wavelength light, and the specimen emits fluorescence of a longer wavelength than that of the short-wavelength light as excited light.

Figure 1:
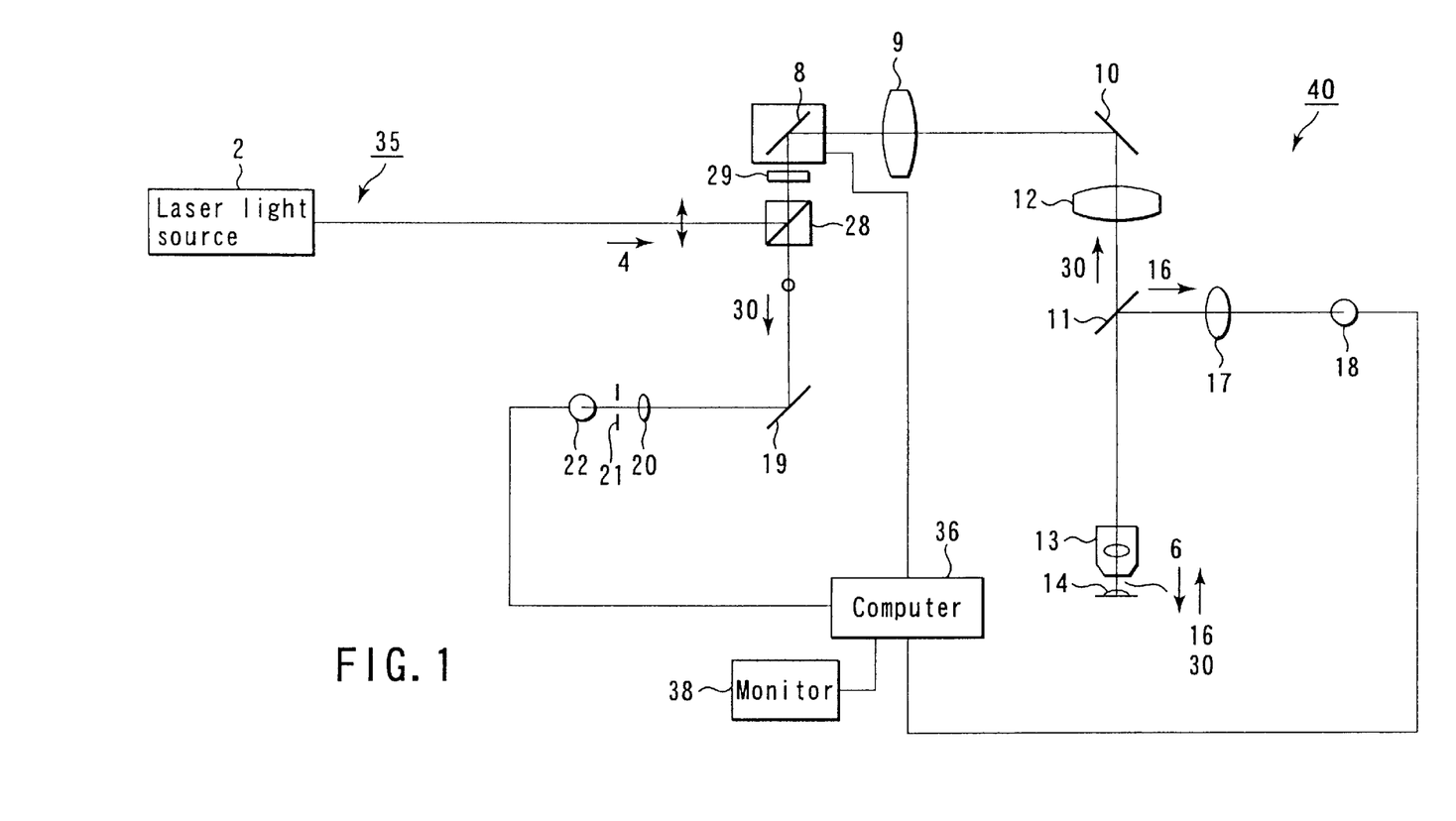
FIG. 1 is a schematic diagram of the optical system of a laser microscope according to a first embodiment of the present invention.

A first embodiment of the invention will be explained referring to FIG. 1. A laser microscope 40 of this embodiment includes a short-pulse laser light source 2 as a laser beam irradiation mechanism 35 which emits ultra-short pulse laser etc. As a laser light source 2, a titanium sapphire laser with a pulse width of several tens fs to several hundred fs and a frequency of several tens MHz to several hundred MHz is generally employed. It evokes a 2-photon excitation on a specimen 14 mentioned later.

Laser beam 4 emitted from the exit port (not shown) of the laser light source 2 may be pre-polarized or polarized by passing through the optical system (not shown) after being emitted. In the optical path of a polarized laser beam 4, a second beam splitter 28, including a polarizing beam splitter, is preferably provided inclined at 45° to the optical path. This second beam splitter 28 has a characteristic to reflect the polarized laser beam 4. Thus, the second beam splitter 28 reflects the laser beam 4 rectangularly.

A ¼-waveplate 29 is provided in the optical path of the laser beam 4. This beam 4 is made incident on the ¼-waveplate 29 and is converted to be circularly polarized. And, laser beam (hereinafter referred to as beam) 6 with different characteristic from that of laser beam 4 is emitted from the ¼-waveplate 29. A galvanomirror 8 is provided in the optical path of the beam 6 emitted from the ¼-waveplate 29. The galvanomirror 8 polarizingly scans the incident beam 6 in the two-dimensional (X-Y) direction and reflects it in an optional direction within a predetermined range.

A projection lens 9, a reflector 10 and a focusing lens 12 are sequentially provided in the optical path of the beam 6 reflected by the galvanomirror 8. The beam 6 is reflected by the reflector 10 through the projection lens 9, and applied to the focusing lens 12.

In the optical path of the beam 6 outputted from the focusing lens 12, a first beam splitter 11 is provided preferably inclined at 45° to the optical path. This first beam splitter 11 preferably includes a dichroic mirror. The beam 6 enters and passes through the first beam splitter 11. The characteristics of the first beam splitter 11 will be explained later.

In the optical path of the beam 6 outputted from the first beam splitter 11, an objective lens 13 is provided to condense the beam 6 at a predetermined distance. Living body tissue (hereinafter referred to as a specimen) 14, for example, is arranged in front of the objective lens 13. The beam 6 is emitted from the objective lens 13 and focused onto the specimen 14.

Therefore, when the beam 6 is irradiated and condensed onto the specimen 14, the specimen 14 reflects the beam 6, and a reflected light 30 is generated. At the same time, 2-photon excitation phenomenon (a non-linear phenomenon) occurs, and the specimen 14 emits fluorescence 16.

The reflected light 30 is obtained from the whole area irradiated by the beam 6. Whereas, the 2-photon excited fluorescence 16 is emitted only from the focal (condensed) point of the beam 6 on the objective lens 13. Therefore, the 2-photon exited fluorescence 16 has a resolving power in the optical axis direction (Z-direction), that is, in the thickness direction of the specimen 14.

The reflected light 30 and fluorescence 16 enter the first beam splitter 11 through the objective lens 13. The first beam splitter 11 passes the beam 6 and reflected light 30. It also has the characteristic to reflect the fluorescence 16 generated by 2-photon excitation. Thus, the first beam splitter 11 generally rectangularly reflects only the fluorescence 16 separated from the optical axes of the beam 6 and the reflected light 30.

A condenser lens 17 is provided in the optical path of the fluorescence 16 reflected by the first beam splitter 11. A first photodetector 18 is provided in front of the condenser lens 17. The first photodetector 18 includes a photo-multiplier, for example. Thus, when the fluorescence 16 transmitted through the condenser lens 17 enters the photodetector 18, photo-electric conversion occurs and the fluorescence 16 is converted into an electric signal. The fluorescence 16 itself has the resolving power in the optical axis direction, and this eliminates the necessity of using a pinhole usually used in a scan-type microscope and arranged in front of the first photodetector 18.

Reflected light 30 passes through the first beam splitter 11, and is made re-incident on the ¼-waveplate 29 after traveling through the focusing lens 12, the reflector 10, the projection lens 9 and the galvanomirror 8. By passing through the ¼-waveplate 29, the reflected light 30 being converted into a circularly polarized light is converted into a linearly polarized light with the polarizing direction of 90° to the laser beam 4. Thus, the reflected light 30 passes through the second beam splitter (a polarizing beam splitter) 28.

In the optical path of the reflected light 30, a reflector 19 is provided to reflect the reflected light 30 in a predetermined direction. In the optical path of the reflected light 30 reflected by the reflector 19, a condenser lens 20 to condense the reflected light 30 and a pinhole 21 are sequentially arranged. The reflected light 30 is condensed on the pinhole 21 by the condenser lens 20. The pinhole 21 is provided at a position conjugative to the focal point of the objective lens 13. Reflected light 30 is focused on the surface of the pinhole 21, and only the light reflected at the focal point passes through the pinhole 21.

A second photodetector 22 is provided in the optical path of the reflected light 30 passed through the pinhole 21. The second photodetector 22 includes a photo-multiplier, for example. Thus, when the reflected light 30 enters the photodetector 22, photo-electric conversion occurs and the reflected light 30 is converted into an electric signal.

The electric signals converted from the fluorescence 16 generated by 2-photon excitation and the reflected light 30 by photo-electric conversion on the first and second photodetectors 18, 22 respectively are processed by a computer 36 into an image. This image is displayed on a monitor 38 connected to the computer 36.

Therefore, according to the first embodiment of the invention, there is provided a laser microscope 40 which provides at a time a fluorescence image 16 generated by 2-photon excitation and a confocal reflected light image 30.

The second embodiment of the invention will now be described with reference to FIG. 2 and FIG. 3. The second embodiment is a modification of the first embodiment. In these figures, like reference numerals indicate corresponding members having similar effects and functions, so they will not be described in detail.

A laser microscope 50 has a laser beam radiation mechanism 35. The laser beam radiation mechanism 35 has a laser light source 1 to emit laser beam 3 to evoke 1-photon excitation of a specimen 14. It also has a short-pulse laser light source 2 to emit laser beam 4, such as an ultra-short pulse laser, to cause 2-photon excitation. A dichroic mirror 5 (a laser beam-combining optical system) is arranged in front of the laser light sources 1, 2. This dichroic mirror 5 is inclined against the optical paths of the laser beams 3, 4 and has the function of combining them. The dichroic mirror 5 reflects laser beam 3 emitted from the laser light source 1 to evoke 1-photon excitation, and passes laser beam 4 emitted from the short-pulse laser light source 2 to cause 2-photon excitation. Thus, laser beams 3, 4 are combined into one laser beam 6 by the dichroic mirror (also referred to as beam 6) 5. The laser beam radiation mechanism 35 is composed in this way.

In the optical path of beam 6, a second beam splitter 7, including a dichroic mirror, is provided, preferably inclined at 45° to beam 6. The characteristics of the second beam splitter 7 will be explained later. Beam 6 is applied to the second beam splitter 7 and rectangularly deflected. Beam 6 is two-dimensionally scanned by the galvanomirror 8 and transmitted to the projection lens 9. And, as in the first embodiment shown in FIG. 1, beam 6 is emitted from the objective lens 13 and focused on the specimen 14 through the reflector 10, the focusing lens 12, the first beam splitter 11 and the objective lens 13.

First beam splitter 11 of the second embodiment preferably includes a dichroic mirror. The characteristics of this first beam splitter 11 will be explained later.

Laser beam 3 is irradiated onto a specimen 14, which evokes 1-photon excitation, thereby generating fluorescence (hereinafter referred to as 1-photon excited fluorescence) 15 (a linear phenomenon). At the same time, laser beam 4 is irradiated onto the specimen 14, causing 2-photon excitation, thereby generating fluorescence (hereinafter referred to as 2-photon excited fluorescence) 16 (a non-linear phenomenon). As shown in FIG. 3A, the 1-photon excited fluorescence 15 is generated from all areas irradiated by laser beam 3. Whereas, as shown in FIG. 3B, the 2-photon excited fluorescence 16 is generated only from the focal point of laser beam 4 on the objective lens 13. Therefore, 2-photon excited fluorescence 16 has a resolving power in the optical axis direction (Z-direction).

Figure 2:
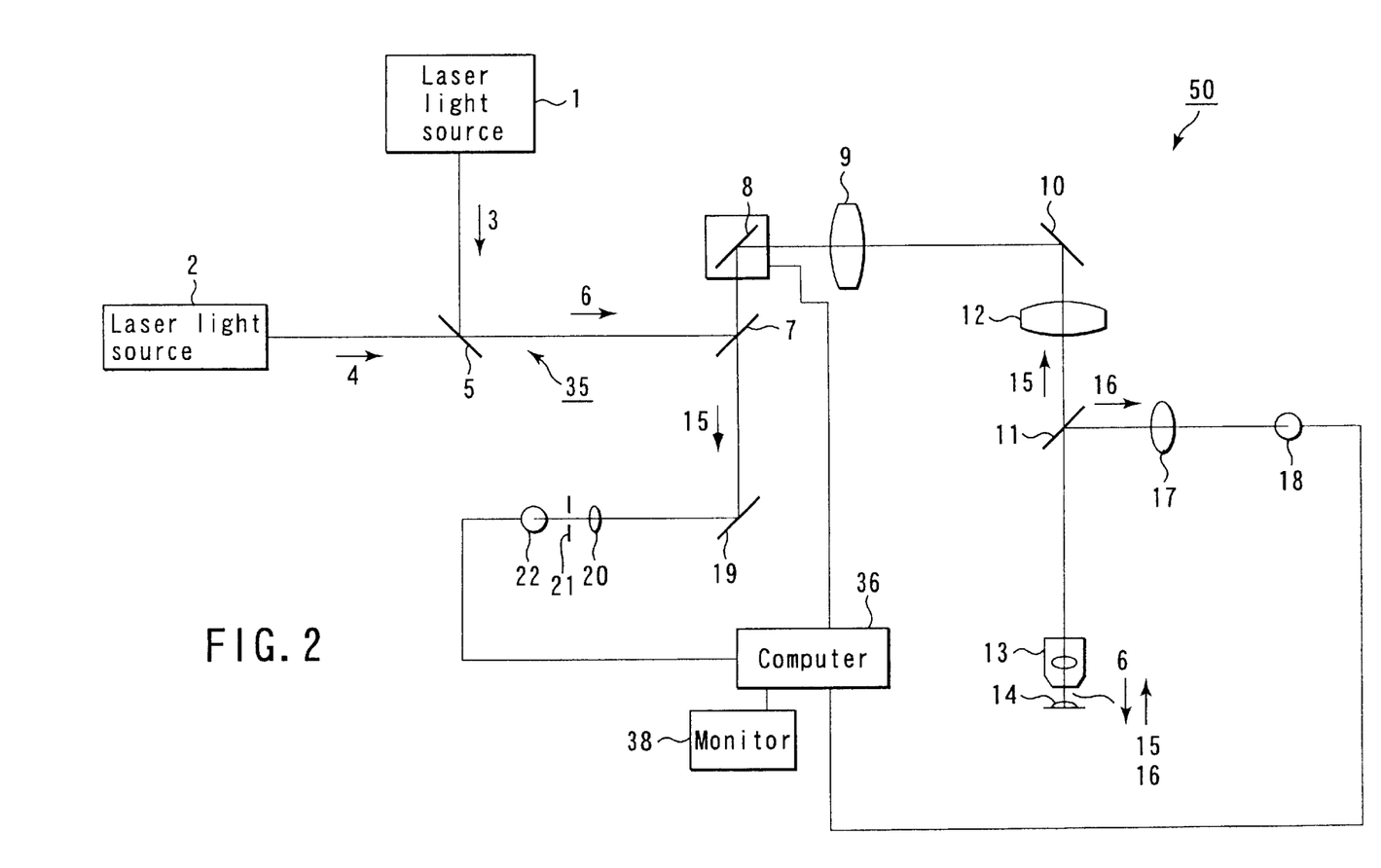
FIG. 2 is a schematic diagram of the optical system of a laser microscope according to a second embodiment of the present invention.
Figure 3A:
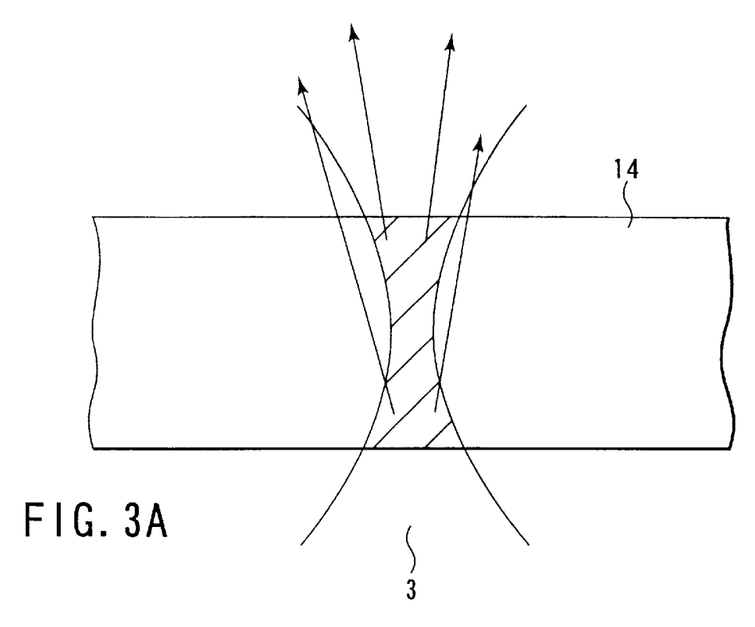
FIG. 3A is a schematic view illustrating the fluorescence radiating state according to a second embodiment of the invention.
Figure 3B:
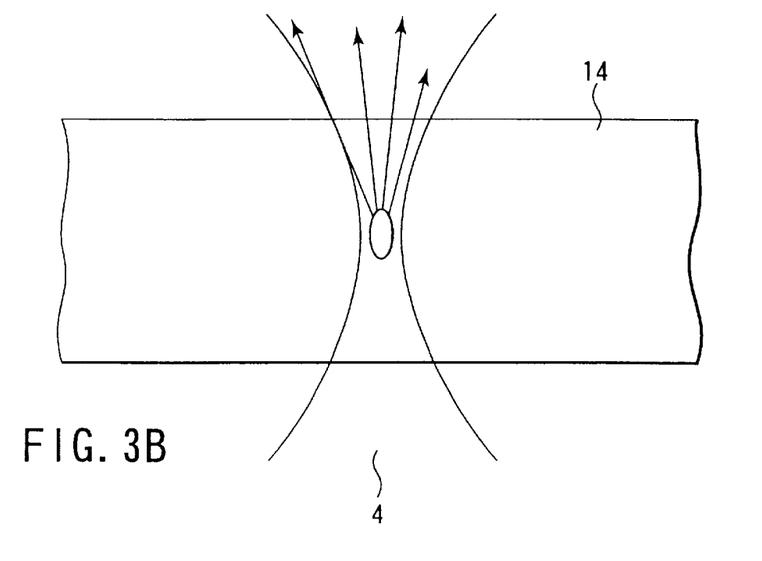
FIG. 3B is a schematic view illustrating the radiation of fluorescence excited by multi-photon excitation phenomenon.

As shown in FIG. 2, the 1-photon excited fluorescence 15 and 2-photon excited fluorescence 16 emitted from the specimen 14 respectively are led into the first beam splitter 11 through the objective lens 13. The first beam splitter 11 passes laser beams 3, 4 (beam 6) and 1-photon excited fluorescence 15, but reflects the 2-photon excited fluorescence 16. Thus, only 2-photon excited fluorescence 16 is reflected (deflected) by the first beam splitter 11, and is separated from the optical axes of beam 6 and 1-photon excited fluorescence 15.

The deflected 2-photon excited fluorescence 16 enters the first photodetector 18 through the condenser lens 17, and is converted into an electric signal by the photo-electric conversion. Since 2-photon excitation (multi-photon excitation) occurs only at the focal point of the objective lens 13, a resolving power in the optical axis direction equivalent to that of a confocal microscope can be obtained without providing a pinhole on the detection side. Therefore, a confocal pinhole is unnecessary to detect the 2-photon excited fluorescence 16, because the 2-photon excited fluorescence 16 has essentially a resolving power in the Z-direction when it is generated.

On the other hand, 1-photon excited fluorescence 15 passes through the first beam splitter 11 and goes into the second beam splitter 7 through the focusing lens 12, the reflector 10, the projection lens 9 and the galvanomirror 8.

The second beam splitter 7 reflects laser beams 3, 4 (beam 6), but passes the 1-photon excited fluorescence 15. Thus, after passing through the second beam splitter 7, the 1-photon excited fluorescence 15 is deflected by the reflector 19 and applied to a condenser lens 20. Since the 1-photon excited fluorescence 15 does not have a resolving power in the Z-direction, a confocal pinhole 21 is provided at a position conjugative to the focal point of the objective lens 13. The 1-photon excited fluorescence 15 is focused onto the pinhole 21 by the condenser lens 20, and only the fluorescence 15 generated at the focal point of the objective lens 13 passes through the pinhole 21 and into the second photodetector 22, where it is converted into an electric signal by the photo-electric conversion.

The 1-photon excited fluorescence 15 and 2-photon excited fluorescence 16 converted into the electric signals by the photo-electric conversion are processed by computer 36 into an image, as in the first embodiment. This image is displayed on a monitor 38.

Therefore, according to the second embodiment, there is provided a laser microscope 50 which provides at a time a confocal fluorescence image 15 by 1-photon excitation and a 2-photon excited fluorescence image 16 by 2-photon excitation.

Figure 4:
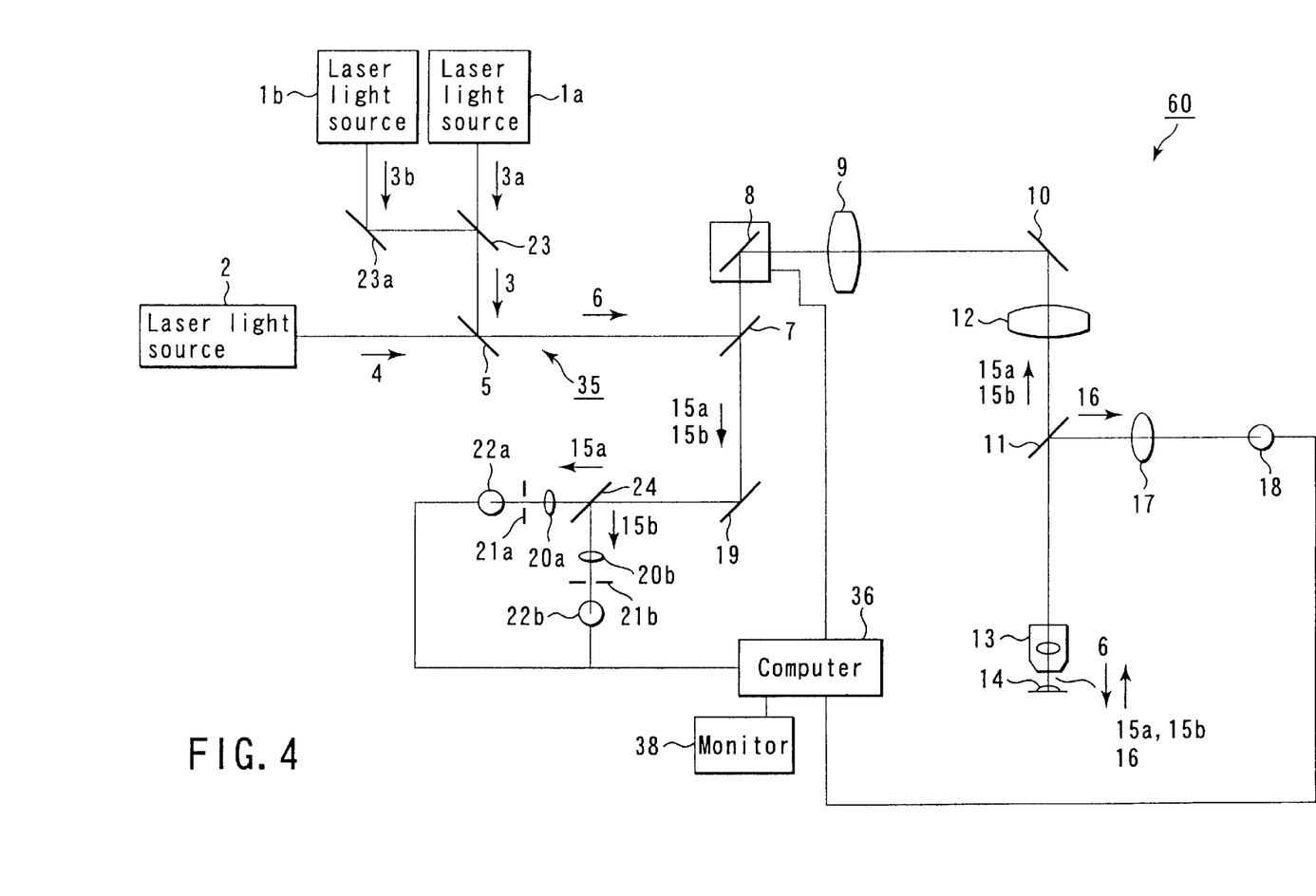
FIG. 4 is a schematic diagram of the optical system of a laser microscope according to a third embodiment of the invention.

Next, the third embodiment will be explained by reference to FIG. 4. In this figure, like reference numerals indicate corresponding members having similar effects and functions, and their detailed descriptions will be omitted.

A laser microscope 60 has a laser beam radiation mechanism 35. The laser beam radiation mechanism 35 has laser light sources 1a, 1b to emit laser beams 3a, 3b to evoke 1-photon and 2-photon excitation on a specimen 14. It also has a short-pulse laser light source 2 to emit a laser beam 4 such as a ultra-short pulse laser to cause 2-photon excitation.

A mirror 23a is provided in the optical path of laser beam 3b emitted from the laser light source 1b. This mirror 23a reflects the incident laser beam 3b in a predetermined direction.

Dichroic mirror 23 is provided in the optical paths of laser beams 3a, 3b. The dichroic mirror 23 is inclined against the optical paths of laser beams 3a, 3b and has the function of combining laser beams 3a, 3b. The dichroic mirror 23 passes laser beam 3a and reflects laser beam 3b in a predetermined direction. Thus, laser beams 3a, 3b are combined into laser beam 3 (hereinafter referred to as a beam).

Dichroic mirror 5 is provided on the optical path of laser beam 4, emitted from the short-pulse light source 2, and laser beam 3 emitted from the laser light source 1, to combine laser beams 3, 4. The resultant beam 6 is condensed and irradiated onto the specimen 14 through the second beam splitter 7, the galvanomirror 8, the projection lens 9, the reflector 10, the focusing lens 12, the first beam splitter 11 and the objective lens 13.

Laser beams 3a, 3b are irradiated onto the specimen 14 to evoke 1-photon excitation. The specimen 14 thus generates fluorescences 15a, 15b (hereinafter referred to as 1-photon excited fluorescence). At the same time, laser beam 4 is irradiated onto the specimen 14 to cause 2-photon excitation. The excited specimen 14 emits fluorescence 16 (hereinafter referred to as 2-photon excited fluorescence).

The 1-photon excited fluorescences 15a, 15b, and 2-photon excited fluorescence 16 enter the first beam splitter 11 through the objective lens 13. The 2-photon excited fluorescence 16 is deflected by the first beam splitter 11, and is detected by the first photodetector 18 through the condenser lens 17, as in the second embodiment.

On the other hand, the 1-photon excited fluorescences 15a, 15b pass through the first beam splitter 11, and enter the second beam splitter through the focusing lens 12, the reflector 10, the projection lens 9 and the galvanomirror 8.

The second beam splitter 7 reflects laser beam 6, but passes the 1-photon excited fluorescences 15a, 15b. Thus, after passing through the second beam splitter 7, the 1-photon excited fluorescences 15a, 15b are deflected by the reflector 19. In the optical paths of the 1-photon excited fluorescences 15a, 15b, a third beam splitter 24, including a dichroic mirror, for example, is provided tilted at a predetermined angle. The third beam splitter 24 separates the fluorescences 15a and 15b. Here, the fluorescence 15a is passed, but the fluorescence 15b is reflected. Thus, the separated fluorescences 15a, 15b are applied to respective the second photodetectors 22a, 22b, including photomultipliers, through the condenser lenses 20a, 20b, and confocal pinholes 21a, 21b, for example, converted into electric signals.

Therefore, according to the third embodiment of the invention, there is provided a laser microscope 60 which provides at a time a confocal reflected light image 15 by 1-photon excitation and a 2-photon excited fluorescence image 16 by 2-photon excitation.

Figure 5:
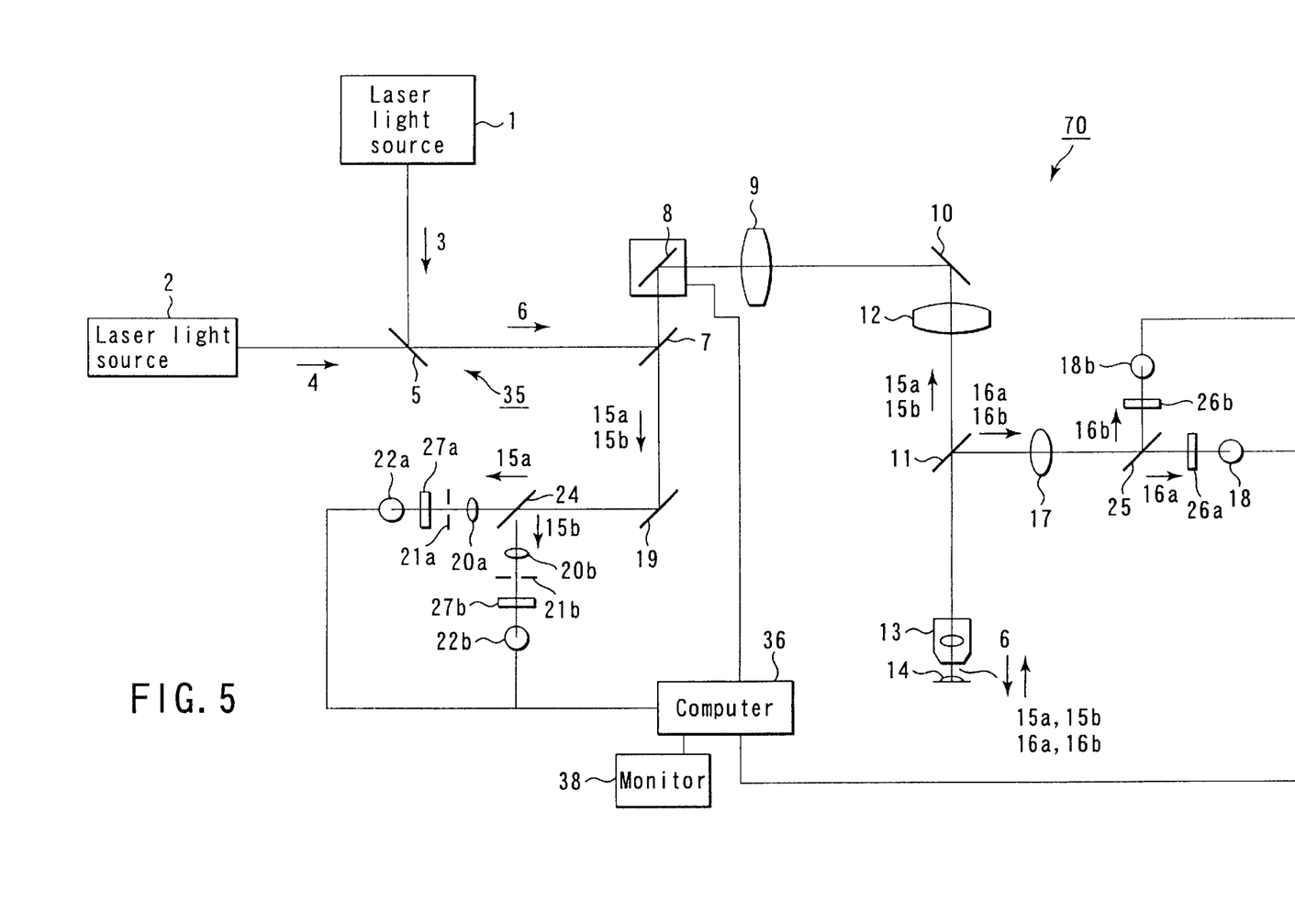
FIG. 5 is a schematic diagram of the optical system of a laser microscope according to a fourth embodiment of the invention.

Next, the fourth embodiment will be explained with reference to FIG. 5 and FIG. 6. In these figures, like reference numerals are given to like parts and elements having similar effects and functions, as those in the first to third embodiments, and their detailed descriptions will be omitted.

A laser microscope 70 has a laser beam radiation mechanism 35. The laser beam radiation mechanism 35 has a laser light source 1 to emit a laser beam 3 with an oscillation wavelength close to the excitation wavelength of reagent A. It also has short-pulse laser light source 2 to emit laser beam 4 with the oscillation wavelength double the excitation wavelength of reagent B. Combined laser beam 6 is condensed on and irradiated to a specimen 14, as in the second and third embodiments. The specimen 14 is doubly colored with the reagents A and B of 1-wavelength exited 2-wavelength fluorescence.

Laser beam 3 is irradiated to the specimen 14 to cause 1-photon excitation phenomenon. The reagent A is excited on the specimen 14, and 1-photon excited fluorescences 15a, 15b are emitted from the specimen 14. At the same time, laser beam 4 is irradiated to the specimen 14 to cause 2-photon excitation. The reagent B is excited on the specimen 14, and 2-photon excited fluorescences 16a, 16b are emitted from the specimen 14.

First beam splitter 11 passes the laser beams 3, 4 and 1-photon excited fluorescences 15a, 15b, but reflects the 2-photon excited fluorescences 16a, 16b. The separated and reflected 2-photon excited fluorescences 16a, 16b enter a condenser lens 17. A fourth beam splitter 25, including a dichroic mirror, for example, is provided tilted at a predetermined angle in front of the 2-photon excited fluorescences 16a, 16b emitted from the condenser lens 17. This fourth beam splitter 25 separates the 2-photon excited fluorescences 16a, 16b. That is, it passes one 2-photon fluorescence 16a, but reflects the other fluorescence 16b. Band-pass filters 26a, 26b are provided in the optical paths of the separated 2-photon excited fluorescences 16a, 16b respectively. The band-pass filters 26a, 26b pass only the wavelength components of the 2-photon excited fluorescences 16a, 16b. First photodetectors 18a, 18b, including photo-multipliers, for example, detect these fluorescences 16a, 16b and converts them into electric signals.

The 1-photon excited fluorescences 15a, 15b, after passing through the first beam splitter 11, enter a third beam splitter 24, as in the third embodiment. One fluorescence 15a passes through the third beam splitter 24, and the other fluorescence 15b is reflected. The 1-photon excited fluorescences 15a, 15b enter sequentially the condenser lenses 20a, 20b and the pinholes 21a, 21b.

Band-pass filters 27a, 27b are provided in the optical paths of the 1-photon excited fluorescences 15a, 15b respectively. These band-pass filters 27a, 27b pass only the wavelength components of the 1-photon excited fluorescences 15a, 15b. Two second photodetectors 22a, 22b detect fluorescences 15a, 15b and convert them into electric signals.

In the fourth embodiment, for increased measurement accuracy, the band-pass filters 26a, 26b, 27a, 27b are provided in front of the first and second photodetectors 18a, 18b, 22a, 22b immediately before the 1-photon excited fluorescences 15a, 15b and 2-photon excited fluorescences 16a, 16b enter these photodetectors 18a, 18b, 22a, 22b, so that noise is reduced and only the wavelength components of the fluorescences 15a, 15b, 16a, 16b can be detected.

As a regent for 1-photon excited 2-wavelength fluorescence, there is for example Indo-1 known as a reagent for calcium ion density measurement and SNARF-1 known as a pH measurement reagent. The specimen 14 is doubly colored with these two reagents. The maximum wavelength of exciting Indo-1 is 350 nm, and maximum fluorescence wavelengths generated by the excitation are 480 nm and 405 nm. The maximum wavelength of exciting SNARF-1 is 530 nm, and maximum fluorescence wavelengths generated by the excitation are 630 nm and 580 nm.

Now, a description will be given on the case where 1-photon excitation is evoked by exciting SNARF-1 by a laser beam with a wavelength of 543 nm emitted from Green He:Ne laser light source. And the resultant fluorescences 15a, 15b are detected by the second photodetectors 22a, 22b through the pinholes 21a, 21b. Described also is the case where 2-photon excitation is evoked by exciting Indo-1 by an ultra-short pulse laser beam with the wavelength of 700 nm emitted from Ti:Sa laser light source, and the resultant fluorescences 16a, 16b are detected by the first photodetectors 18a, 18b.

The first to fourth beam splitters 11, 7, 24, 25, comprising dichroic mirrors, for example, are designed to have the characteristics shown in FIG. 6A to FIG. 6D. In the drawings, the vertical axis indicates the transmissivity of laser beam and fluorescence, and the horizontal axis indicates the wavelength of laser beam and fluorescence.

Figure 6A:
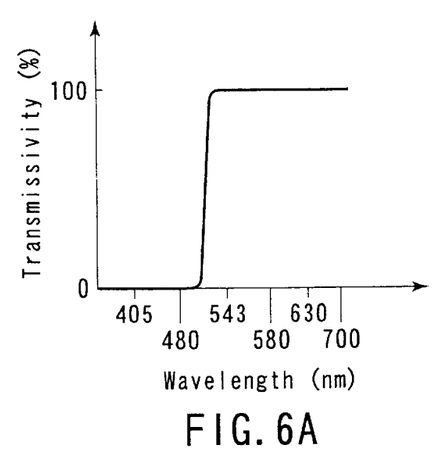
FIG. 6A is a graph showing the wavelength transmissivity of a first beam splitter shown in FIG. 5.
Figure 6B:
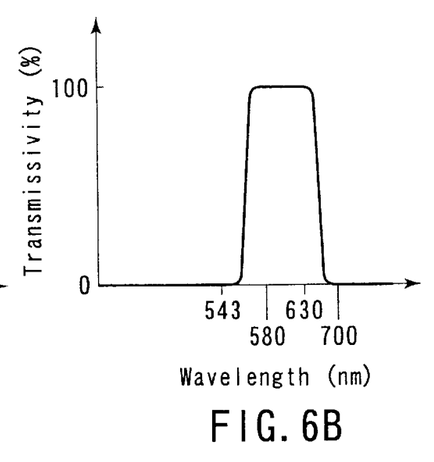
FIG. 6B a graph showing the wavelength transmissivity of a second beam splitter shown in FIG. 5.

The second beam splitter 7 has the characteristics shown in FIG. 6B, and reflects laser beam 3 with the wavelength of 543 nm emitted from the Green He:Ne laser as a laser light source 1, and reflects laser beam 4 with the wavelength of 700 nm emitted from the Ti:Sa laser as a laser light source 2. Therefore, laser beams 3, 4 enter the first beam splitter 11 through the galvanomirror 8, the projection lens 9, the reflector 10 and the focusing lens 12.

The first beam splitter 11 has the characteristics shown in FIG. 6A, and passes laser beam 3 with the wavelength of 543 nm and passes also laser beam 4 with the wavelength of 700 nm.

In this way, laser beams 3, 4 are condensed on and irradiated to the specimen 14 through the objective lens 13. On the specimen 14 colored with SNARF-1 and Indo-1, SNARF-1 is excited by laser beam 3 and laser beam 3 evokes 1-photon excitation. And Indo-1 is excited by laser beam 4 and the laser beam 4 evokes 2-photon excitation.

When SNARF-1 is excited, 1-photon excited fluorescences 15a, 15b with wavelengths of 630 nm, 580 nm are emitted. When Indo-1 is excited, 2-photon excited fluorescences 16a, 16b with wavelengths of 480 nm, 405 nm are emitted. These fluorescences 15a, 15b, 16a, 16b enter the first beam splitter 11 through the objective lens 13.

The first beam splitter 11 has the characteristics shown in FIG. 6A, and passes the 1-photon excited fluorescences 15a, 15b with the wavelengths of 630 nm, 580 nm, and reflects the 2-photon excited fluorescences 16a, 16b with wavelengths of 480 nm, 405 nm. In this way, the 1-photon excited fluorescences 15a, 15b and laser beams 3, 4 are separated from the 2-photon excited fluorescences 16a, 16b.

Figure 6C:
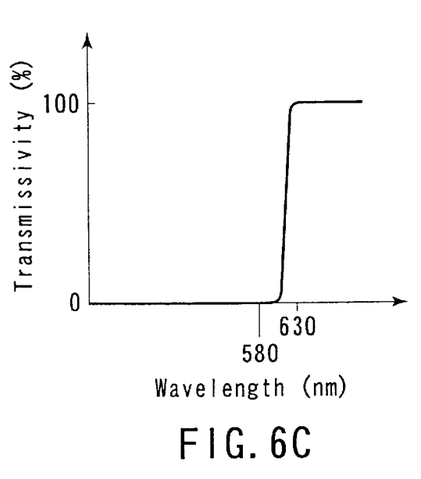
FIG. 6C is a graph showing the wavelength transmissivity of a third beam splitter shown in FIG. 5.
Figure 6D:
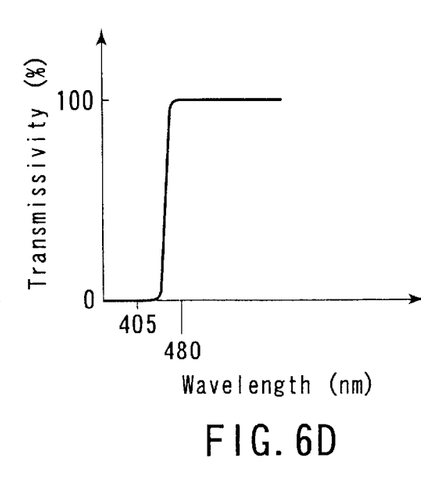
FIG. 6D is a graph showing the wavelength transmissivity of a fourth beam splitter shown in FIG. 5.

The fourth beam splitter 25 has the characteristics shown in FIG. 6D, and passes the 1-photon excited fluorescences 15a, 15b and one 2-photon excited fluorescence 16a with the wavelength of 480 nm separated from the optical axes of laser beams 3, 4, and reflects the other fluorescence 16b with the wavelength of 405 nm. These two fluorescences 16a, 16b are separated in this way.

Therefore, the 2-photon excited fluorescences 16a, 16b emitted by exciting Indo-1 can be detected by the first photodetectors 18a, 18b.

The second beam splitter 7 has the characteristics shown in FIG. 6B, and passes the 1-photon excited fluorescences 15a, 15b with the wavelengths of 630 nm, 580 nm. The 1-photon excited fluorescences 15a, 15b are separated from laser beams 3, 4 in this way.

The third beam splitter 24 has the characteristics shown in FIG. 6C, and passes one 1-photon excited fluorescence 15a with the wavelength of 630 nm, and reflects the other 1-photon excited fluorescence 15b with the wavelength of 580 nm. The two 1-photon excited fluorescences 15a, 15b are separated in this way.

Therefore, the 1-photon excited fluorescences 15a, 15b emitted by exciting SNARF-1 can be detected by the second photodetectors 22a, 22b.

And, the electric signals are applied to the computer 36 to calculate the ratio of the fluorescence quantity detected by the first photodetectors 18a, 18b to that detected by the second photodetectors 22a, 22b. In this way, the calcium density change and pH change in the specimen 14, a living body tissue in this case, can be measured at a time.

Next, the fifth embodiment will be explained by referring to FIG. 7. This embodiment is modified from the fourth embodiment. Description will be given on the case where the calcium ion density is measured by using a probe called Cameleon (trademark), and at the same time the pH is measured with SNARF-1.

First, the calcium ion density measurement using Cameleon will be explained. This utilizes the energy transfer of two fluorescence proteins, CFP and YFP. For instance, laser beam with the wavelength of 442 nm excites CFP, and YFP is excited by the excited CFP energy. Then, the fluorescence quantity ratio of the CFP fluorescence with the wavelength of 485 nm to the YFP fluorescence with the wavelength of 530 nm is measured.

In the case where Cameleon is excited, laser beam 3 from He:Cd laser light source with the wavelength of 442 nm is irradiated to a specimen 14. The fluorescences 15a, 15b generated by 1-photon excitation are detected by second photodetectors 22a, 22b by using confocal pinholes 21a, 21b, and converted into electric signals. In the case where SNARF-1 is excited, laser beam 4 from Ti:Sa laser light source with the wavelength of 1000 nm is irradiated to the specimen 14. The fluorescences 16a, 16b generated by 2-photon excitation are detected by first photodetectors 18a, 18b, and converted into electric signals.

The first to fourth beam splitters 11, 7, 24, 25, including preferably of dichroic mirrors, are designed to have the characteristics shown in FIG. 7A to FIG. 7D. In these figures, the characteristics are plotted along the abscissa and ordinate as in FIG. 7A to FIG. 7D as well as FIG. 6A to FIG. 6D.

Figure 7A:
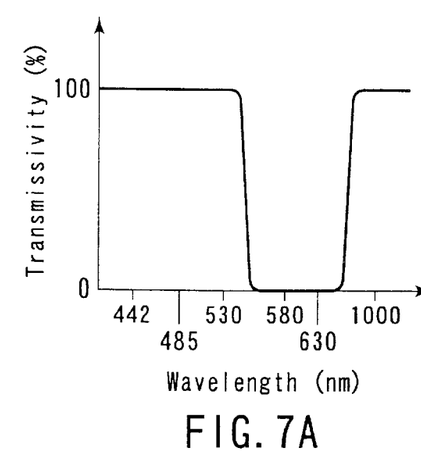
FIG. 7A is a graph showing the wavelength transmissivity of a first beam splitter according to a fifth embodiment and shown in FIG. 5.
Figure 7B:
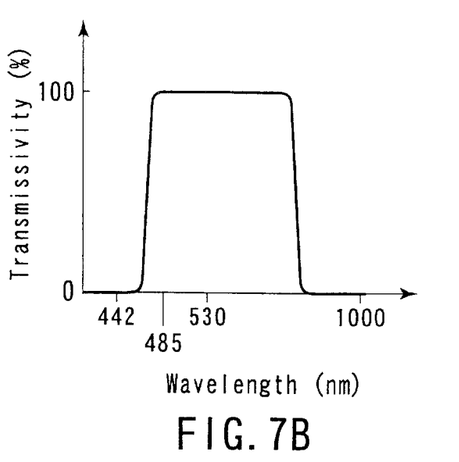
FIG. 7B is a graph showing the wavelength transmissivity of a second beam splitter shown in FIG. 5.

The second beam splitter 7 has the characteristics shown in FIG. 7B, and reflects laser beam 3 with the wavelength of 442 nm emitted from the He:Cd laser source as a laser light source 1, and also reflects laser beam 4 with the wavelength of 1000 nm emitted from the Ti:Sa laser source as a laser light source 2.

The first beam splitter 11 has the characteristics shown in FIG. 7A, and passes laser beam 3 with the wavelength of 442 nm, and passes laser beam 4 with the wavelength of 1000 nm.

In this way, the laser beams 3, 4 are condensed on and irradiated to the specimen 14 through the objective lens 13. On the specimen 14 marked by Cameleon and colored with SNARF-1, Cameleon of CFP is excited by laser beam 3 and the laser beam 3 evokes 1-photon excitation phenomenon. And SNARF-1 is excited by laser beam 4 and the laser beam 4 evokes 2-photon excitation phenomenon.

When the CFP of Cameleon is excited, fluorescence 15b with the wavelength of 485 nm is emitted. With the CFP being excited, energy transfer occurs, YFP is excited, and fluorescence 15a with the wavelength of 530 nm is emitted. When SNARF-1 is excited, the 2-photon excited fluorescences 16a, 16b with the wavelengths of 630 nm, 580 nm respectively are emitted.

The first beam splitter 11 has the characteristics shown in FIG. 7A, and passes the 1-photon excited fluorescences 15a, 15b with the wavelengths of 530 nm and 485 nm, but reflects the 2-photon excited fluorescences 16a, 16b with the wavelengths of 630 nm and 580 nm. In this way, the 1-photon excited fluorescences 15a, 15b and laser beams 3, 4 are separated from the 2-photon excited fluorescences 16a, 16b.

Figure 7C:
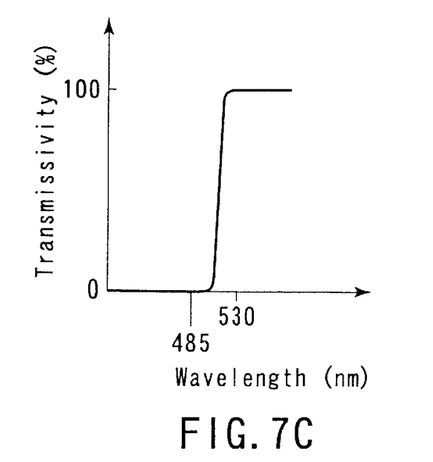
FIG. 7C is a graph showing the wavelength transmissivity of a third beam splitter shown in FIG. 5.
Figure 7D:
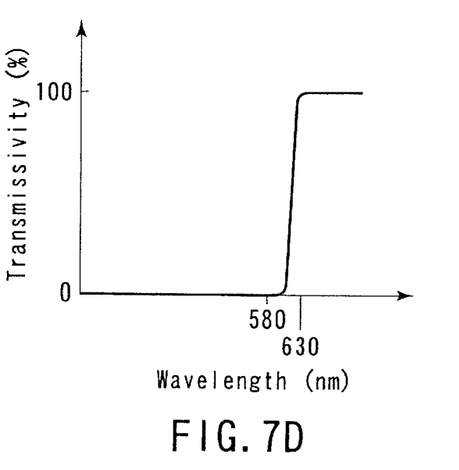
FIG. 7D is a graph showing the wavelength transmissivity of a fourth beam splitter shown in FIG. 5.

The fourth beam splitter 25 has the characteristics shown in FIG. 7D, and passes one 2-photon excited fluorescence 16a with the wavelength of 630 nm, and reflects the other 2-photon excited fluorescence 16b with the wavelength of 580 nm. These two fluorescences 16a, 16b are separated in this way.

Therefore, the 2-photon excited fluorescences 16a, 16b emitted by exciting SNARF-1 can be detected by the first photodetectors 18a, 18b.

The second beam splitter 7 has the characteristics shown in FIG. 7B, and passes the 1-photon excited fluorescences 15a, 15b with the wavelengths of 530 nm, 485 nm. The 1-photon excited fluorescences 15a, 15b are separated from laser beams 3, 4 in this way.

The third beam splitter 24 has the characteristics shown in FIG. 7C, and passes one 1-photon excited fluorescence 15a with the wavelength of 530 nm, and reflects the other fluorescence 15b with the wavelength of 485 nm. These two 1-photon excited fluorescences 15a, 15b are separated in this way.

Therefore, the 1-photon excited fluorescence 15b emitted by exciting the CFP of Cameleon and fluorescence 15a emitted by exciting YFP by energy transfer can be detected by the second photodetectors 22a, 22b respectively.

And, as in the fourth embodiment, the calcium density change and pH change in the specimen 14, a living body tissue in this case, can be measured at a time.

It is to be noted that the specimen 14 is multi-colored with a plurality of reagents, e.g., two reagents, as explained in the fourth and fifth embodiments. One of the reagents is excited by multiple photons, e.g., two photons, to obtain the resultant fluorescence. This divides the excited light wavelength into the short-wavelength side and long-wavelength side in the fluorescence wavelength range, making it easy to separate the excited light wavelength range from the fluorescence wavelength range. This makes it possible to give the beam splitters 11, 7, 24 and 25 the characteristic of separating the laser beam and fluorescence according to their wavelengths, without complicating the original characteristics.

Figure 8:
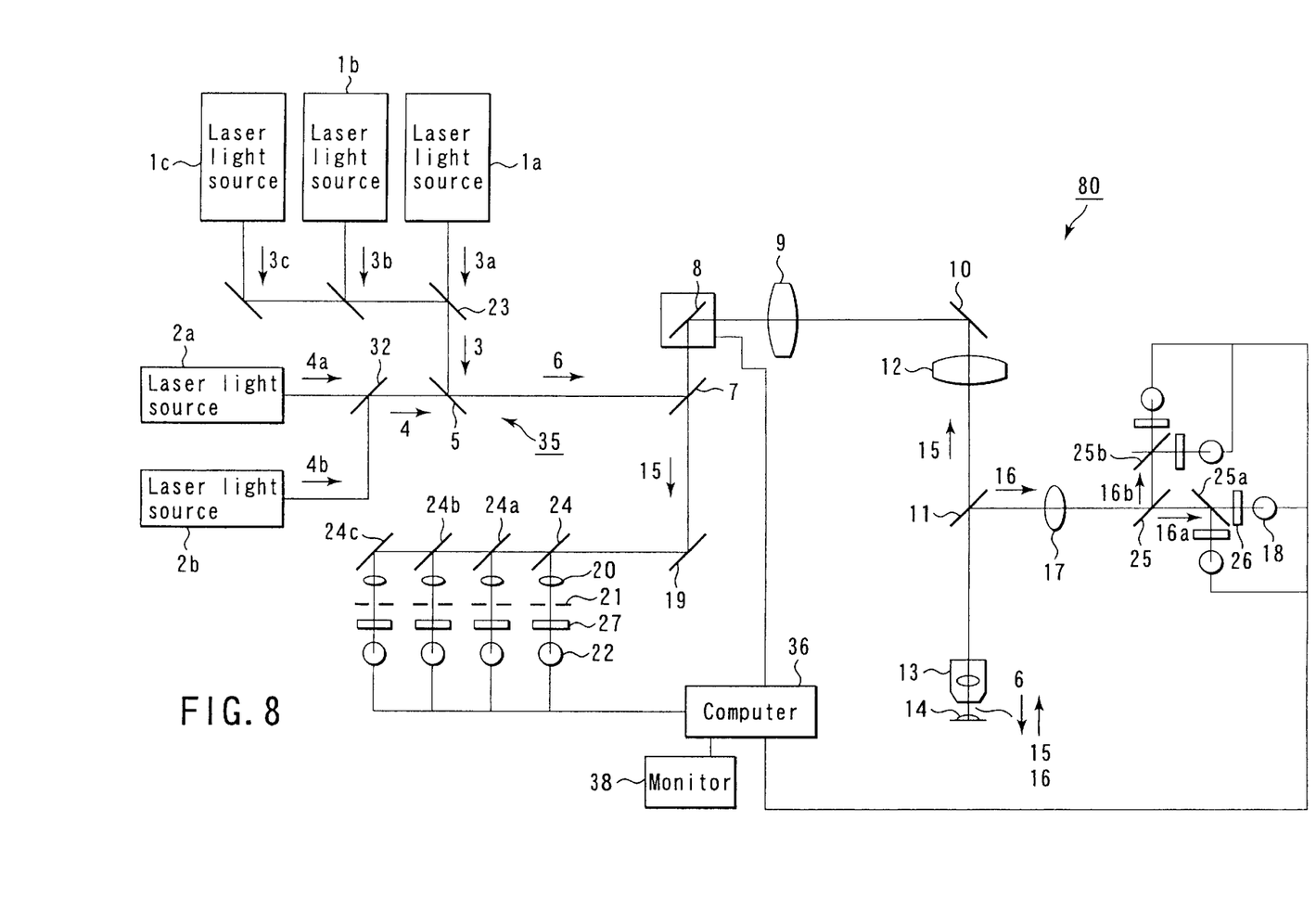
FIG. 8 is a schematic diagram of the optical system of a laser microscope according to a sixth embodiment of the invention.

Next, the sixth embodiment will be explained by referring to FIG. 8. In this figure, like reference numerals are given to the like parts and elements having similar effects and functions as those in the first to fifth embodiments, and detailed description will be omitted.

A laser microscope 80 of this embodiment is modified from the first to fourth embodiments. The laser beam radiation mechanism 35 has a plurality of laser light sources 1a, 1b, 1c (three, in this case) to evoke 1-photon excitation phenomenon on the specimen 14, as in the third embodiment. It also has a plurality of short-pulse laser light sources 2a, 2b (two, in this case) to evoke 2-photon excitation on the specimen 14. A mirror 23 combines laser beams 3a, 3b, 3c emitted from the laser light sources 1a, 1b, 1c, and outputs resultant laser beam 3. The mirror 32 also combines laser beams 4a, 4b emitted from the short-pulse laser light sources 2a, 2b, and outputs resultant laser beam 4.

In the optical path of fluorescence 16a passing through the fourth beam splitter 25, a fifth beam splitter 25a, including preferably of a dichroic mirror, is provided. A sixth beam splitter 25b, including preferably of a dichroic mirror, is provided in the optical path of fluorescence 16b separated by the fourth beam splitter 25. The fluorescences 16a, 16b can be further separated in this way. In the optical paths of fluorescences 16a, 16b passing through or reflected by the fifth and sixth beam splitters 25a, 25b, a band-pass filter 26 and a first photodetector 18 are provided in sequence.

A plurality of mirrors 24a, 24b, 24c (three, in this case) is provided in front of the third beam splitter 24. The two mirrors 24a, 24b out of these three include a dichroic mirror, and the third mirror 24c includes a reflector.

In the optical path of fluorescence 15 reflected by the mirrors 24a, 24b, 24c, a condenser lens 20, a confocal pinhole 21, a band-pass filter 27 and a second photodetector 22 are arranged in sequence.

In the sixth embodiment, three laser light sources 1 and two short-pulse laser light sources 2 are provided to evoke 1-photon excitation and 2-photon excitation, respectively, on the specimen 14, but the number of the light sources is not restricted. Combination of the light sources can also be changed by the characteristics of beam splitters (dichroic mirrors).

In the first to sixth embodiments, when laser beam is emitted to the specimen 14 from a short-pulse laser light source, fluorescence generated by 2-photon excitation phenomenon is emitted. But, the fluorescence is not restricted to this one generated by 2-photon excitation. There may be fluorescence generated by multi-photon excitation, such as 3-photon and 4-photon. In addition, Raman light, $2^{nd}$ higher harmonics and $3^{rd}$ higher harmonics, for example, may be generated. And, these fluorescence, as well as, Raman light and $2^{nd}$ and $3^{rd}$ higher harmonics can be detected in the same way. Thus, any light generated by non-linear phenomenon occurred on a specimen 14 can be detected as well.

Further, linear phenomenon is not restricted to 1-photon excited fluorescence. Any light obtained from the specimen increasing almost proportional to the output of incident laser beam will be included.

Concerning the beam splitter characteristics, the transmission-reflection relationship depending on the wavelength can be reversed. The confocal detection structure can be that a condenser lens and a pinhole are arranged before an incident light is divided by the beam splitter into different wavelengths. Further, the scanning optical system is not restricted to a galvanomirror, but any other system is permitted as long as two-dimensional scanning of laser beam is possible.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A laser microscope for observing a specimen, comprising:
    a laser light source to radiate a laser beam;
    a scanning optical system to scan the laser beam radiated from the laser light source in at least one direction;
    an objective lens to condense the laser beam scanned by the scanning optical system onto the specimen, and to receive from the specimen the light generated by a linear phenomenon, the light generated by a non-linear phenomenon evoked by condensation and the reflected light of the laser beam;
    a first beam splitter which is arranged between the objective lens and the scanning optical system, and selectively separates the laser beam, the light obtained from the specimen by the linear phenomenon and the reflected light, from the light obtained from the specimen by the non-linear phenomenon;
    a first photodetector to detect the light generated by the non-linear phenomenon separated by the first beam splitter;
    a second beam splitter which is arranged between the laser light source and the scanning optical system, and separates the laser beam from the light obtained from the specimen by the linear phenomenon and the reflected light; and,
    a second photodetector which includes a pinhole arranged at a position conjugative to the focal point of the objective lens, and detects the light passing the pinhole among the light generated by the linear phenomenon and the reflected light separated by the second beam splitter.

2. The laser microscope according to claim 1, wherein the first beam splitter comprises a dichroic mirror which passes one of the laser beam, the light generated by linear phenomenon evoked on the specimen and the reflected light, and the light generated by the non-linear phenomenon, and reflects the other.

3. The laser microscope according to claim 1, wherein the second beam splitter comprises a dichroic mirror which passes one of the laser beam and the reflected light from the specimen, and the light obtained by the linear phenomenon, and reflects the other.

4. A laser microscope for observing a specimen, comprising:
    a laser beam radiation mechanism including at least one laser light source to evoke a linear phenomenon on the specimen and at least one short-pulse laser light source to evoke a non-linear phenomenon on the specimen, and a laser beams combining optical system to combine the laser beams emitted from the laser light source and the short-pulse laser light source;
    a scanning optical system to scan the laser beam combined by and outputted from the laser beam radiation mechanism in at least one direction;
    an objective lens to condense the laser beam scanned by the scanning optical system to the specimen, and to receive from the specimen the lights generated by the linear and the non-linear phenomenon evoked by condensation of the laser beam;
    a first beam splitter which is arranged between the objective lens and the scanning optical system, and selectively separates the light emitted from the specimen by the linear phenomenon evoked by the laser beam emitted from the laser light source and the combined laser beam, from the light from the specimen by the non-linear phenomenon evoked by the laser beam emitted from the short-pulse laser light source;
    a first photodetector to detect the light generated by the non-linear phenomenon separated by the first beam splitter;
    a second beam splitter which is arranged between the laser beam radiation mechanism and the scanning optical system, and selectively separates the combined laser beam from the light emitted from the specimen by the linear phenomenon evoked by the laser beam emitted from the laser light source; and,
    a second photodetector which includes a pinhole arranged at a position conjugative to the focal point of the objective lens, and detects the light passing the pinhole among the light generated by the linear phenomenon separated by the second beam splitter.

5. The laser microscope according to claim 4, wherein the first beam splitter includes a dichroic mirror to pass one of the combined laser beam and the lights generated by the linear phenomenon, and the light generated by the non-linear phenomenon, and reflects the other.

6. The laser microscope according to claim 4, wherein the second beam splitter includes a dichroic mirror to pass one of the combined laser beam and the light generated by the linear phenomenon, and reflects the other.

7. The laser microscope according to claim 4, wherein a wavelength selector filter to pass only the light in a predetermined wavelength range is provided between the first photodetector and the first beam splitter.

8. The laser microscope according to claim 4, wherein the laser beams combining optical system includes a dichroic mirror.

9. The laser microscope according to claim 4, further comprising:
    at least one third beam splitter which is arranged on the optical axis between the second beam splitter and the second photodetector, and further splits the lights into lights with different wavelengths separated by the second beam splitter; and,
    a third photodetector which includes a pinhole provided at a position conjugative to the focal point of the objective lens, and detects the light passing through the pinhole among the light generated by the linear phenomenon separated by the third beam splitter.

10. The laser microscope according to claim 9, wherein the third beam splitter includes a dichroic mirror to pass and reflect the lights generated by the linear phenomenon, according to their wavelengths.

11. The laser microscope according to claim 9, further comprising:
    at least one fourth beam splitter which is arranged on the optical axis between the first beam splitter and the first photodetector, and further splits the lights into lights with different wavelengths separated by the first beam splitter; and, a fourth photodetector to detect the lights split by the fourth beam splitter.

12. The laser microscope according to claim 11, wherein the fourth beam splitter includes a dichroic mirror to pass and reflect the lights generated by the non-linear phenomenon, according to their wavelengths.

13. The laser microscope according to claim 11, wherein a wavelength selector filter to pass only the lights including wavelengths in a predetermined range is provided between the fourth photodetector and the fourth beam splitter.

14. The microscope according to claim 4, further comprising:

at least one fourth beam splitter which is arranged on the optical axis between the first beam splitter and the first photodetector, and further splits the lights separated by the first beam splitter into lights with different wavelengths; and, a fourth photodetector to detect the lights split by the fourth beam splitter.

15. The microscope according to claim 14, wherein the fourth beam splitter includes a dichroic mirror to pass and reflect the lights generated by the non-linear phenomenon, according to their wavelengths.

16. The microscope according to claim 14, wherein a wavelength selector filter to pass only the lights including wavelengths in a predetermined range is provided between the fourth photodetector and the fourth beam splitter.

17. The microscope according to claim 14, further comprising:

at least one third beam splitter which is arranged on the optical axis between the second beam splitter and the second photodetector, and further splits the lights into lights with different wavelengths separated by the second beam splitter; and, a third photodetector which includes a pinhole provided at a position conjugative to the focal point of the objective lens, and detects the light passing through the pinhole among the light generated by the linear phenomenon and split by the third beam splitter.

18. The microscope according to claim 17, wherein the third beam splitter includes a dichroic mirror to pass and reflect the lights generated by the linear phenomenon, according to their wavelengths.

19. A laser microscope for observing a specimen, comprising:

a laser beam radiation means to radiate a laser beam;

a scanning optical system to scan the laser beam radiated from the laser beam radiating means in at least one direction;

a condensing means to condense the laser beam scanned by the scanning optical system onto the specimen, to receive from the specimen the light generated by a linear phenomenon, the light generated by a non-linear phenomenon evoked by condensation of the laser beam and the reflected light;

a first beam splitter which is arranged between the condensing means and the scanning optical system, and selectively separates the laser beam, the light obtained from the specimen by the linear phenomenon and the reflected light, from the light obtained from the specimen by the non-linear phenomenon;

a first photodetector to detect the light generated by the non-linear phenomenon and separated by the first beam splitter;

a second beam splitter which is arranged between the laser beam radiation means and the scanning optical system, and separates the laser beam from the light obtained from the specimen by the linear phenomenon and the reflected light; and, a second photodetector to detect the light generated by the linear phenomenon and the reflected light separated by the second beam splitter, so as to include the resolving power in the optical axis direction of the laser beam.

* * * * *